United States Patent [19]

Elmore et al.

[11] Patent Number: 4,845,840
[45] Date of Patent: Jul. 11, 1989

[54] ELECTRODE SUBSTRATE WITH INTEGRAL EDGE SEAL AND METHOD OF FORMING THE SAME

[75] Inventors: Dan E. Elmore, South Windsor; Richard J. Roethlein, Stafford Spring, both of Conn.

[73] Assignee: International Fuel Cells Corporation, South Windsor, Conn.

[21] Appl. No.: 231,800

[22] Filed: Aug. 12, 1988

Related U.S. Application Data

[62] Division of Ser. No. 162,459, Mar. 1, 1988, Pat. No. 4,786,568.

[51] Int. Cl.⁴ .............................................. H01M 8/00
[52] U.S. Cl. ..................................... 29/623.2; 427/115
[58] Field of Search ........................... 29/623.2, 623.5; 427/115; 429/40, 35, 185

[56] References Cited

U.S. PATENT DOCUMENTS 4,185,145  1/1980  Breault .................................. 429/34
4,652,502  3/1987  Breault et al. ......................... 429/13
4,781,727  11/1988  Mitsuda et al. ..................... 29/623.2

Primary Examiner—Anthony Skapars

[57] ABSTRACT

The edges of a porous substrate plate used in a fuel cell power plant are densified by impregnating a suspension of finely divided material in the interstitial spaces in the plate edges. The suspension, in the form of an "ink" is forced into the plate edges via a pressure differential applied through the plate between two press blocks. The ink is forced into the plate after a catalyst layer has been applied to one surface of the substrate plate. The ink thus penetrates to the inner surface of the catalyst layer, and also forms an integral filler band outwardly of the catalyst layer, which filler band has a top surface which is coplanar with the top surface of the catalyst layer. After the impregnation step, the seals are dried to form a dense low porosity border on the substrate plates which will fill with electrolyte to form a wet seal that prevents gas crossover through the edges of the substrate plates.

2 Claims, 3 Drawing Sheets

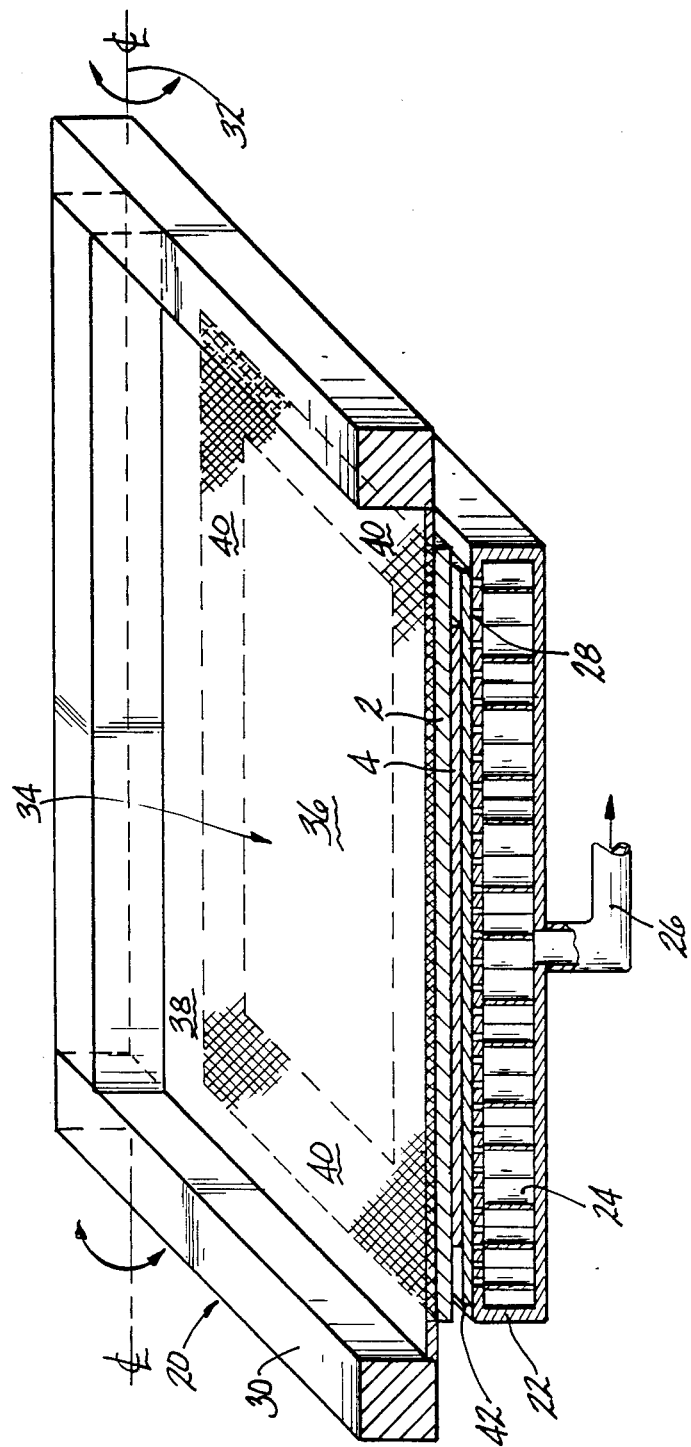

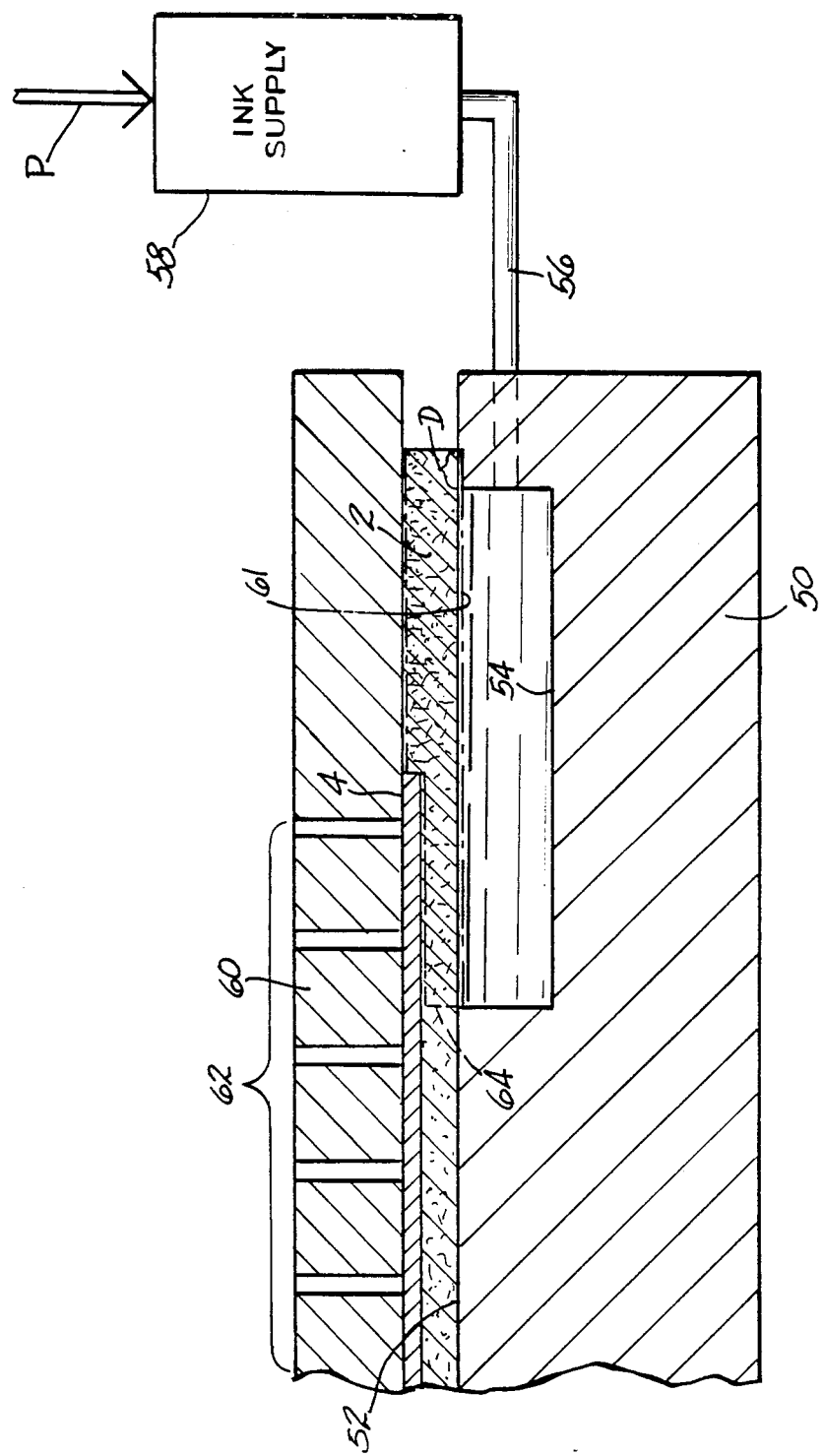

ELECTRODE SUBSTRATE WITH INTEGRAL EDGE SEAL AND METHOD OF FORMING THE SAME

This is a division of application Ser. No. 162,459 filed on Mar. 1, 1988 now U.S. Pat. No. 4,786,568.

TECHNICAL FIELD

This invention relates to electrode plate assemblies for aqueous electrolyte fuel cells, and more particularly to edge seals for such plate assemblies.

BACKGROUND ART

Fuel cell electrode plate assemblies will typically include a porous, thin carbon substrate plate onto one surface of which there is deposited a catalyst layer. The catalyst layer will terminate short of the edges of the substrate plate so that there will be a carbon margin surrounding the catalyst layer. There will also typically be an electrolyte reservoir plate on the side of the substrate opposite the catalyst layer, which reservoir plate will also be a porous carbon structure which is impregnated with additional electrolyte for resupply of electrolyte to the electrolyte matrix. The reservoir plate may be an integral part of the substrate plate in some cases. Reactant gas flow fields will be formed on the side of the substrate plate opposite the catalyst layer.

In order to ensure that the reactant gases cannot cross over from cathode to anode, or reverse at the edges of the substrate plates outwardly of the catalyst layer, these edges must be sealed in some manner so as to prevent diffusion of the reactant gases therethrough. One way to provide such a seal is to locally densify the margins of the substrate plates and then fill the densified portions with liquid electrolyte. The smaller pore sizes in the densified margin will provide a higher surface tension in the liquid filling those pores, so that high reactant gas pressure will not be able to penetrate the entrapped liquid. Thus a liquid seal or "bubble barrier" is formed through which the reactant gases cannot diffuse. There are a number of suggestions in the prior art as to how the densification of the edges of the substrate plate can be accomplished. One general approach involves the use of a very fine grain filler material suspended on a liquid carrier to form what is referred to as an "ink". The ink is then impregnated into the edges of the substrate plate by dipping the edges into the ink, or by injecting the ink into the plate edges under pressure by screen printing. The liquid carrier is then evaporated off leaving the fine grain material behind to reduce the pore size in the edges of the plate. Another method of densifying the edges of the plate which is disclosed in the prior art, involves forming the plates with initially thickened edges which are subsequently compressed thereby densifying their interstices. U.S. Pat. Nos. 3,867,206, granted Feb. 18, 1975 to Trocciola et al; 4,259,389, granted Mar. 31, 1981 to Vine et al; 4,269,642, granted May 26, 1981 to DeCasperis et al; 4,365,008, granted Dec. 21, 1982 to DeCasperis et al; and 4,652,502, granted Mar. 24, 1987 to Donahue et al disclose details of the aforesaid prior art procedures for densifying substrate plate edges to form gas seals. The disclosures of these patents are incorporated herein by reference.

It is highly desirable to have the densified edge portions of the substrate plates underlap the outer edges of the catalyst layer, and it is essential that the top of the densified substrate edge which is outward of the catalyst layer be coplanar with the top of the catalyst layer. In the procedures of the prior art, the edges of the substrate plates are densified prior to the addition of the catalyst layer to the substrate. This ensures that the catalyst will overlap the densified edges of the plates, but creates two problems. One of the problems relates to the difficulty of diffusing gases through the densified edges. This results in non-uniform catalyst deposition on the densified edges when the catalyst is applied by the cloud deposition process. The other problem relates to the fact that the catalyst layer will form a step on the densified edge because the top of the catalyst layer and the top of the densified edge are not coplanar. In order to remedy this deficiency, a thin filler band of the densifying ink must be applied to the top of the densified edges after the catalyst has been deposited. This filler band top surface is made coplanar with the top surface of the catalyst and then the drying step is repeated. Thus when the edges of the substrate are densified prior to application of the catalyst layer, the resultant electrode assembly is somewhat imperfect at the edges of the catalyst layer, and requires additional post catalyst deposition process steps to add the filler band.

DISCLOSURE OF INVENTION

This invention relates to a method for forming an improved electrode substrate-catalyst assembly, and to the product formed thereby. This invention involves forming the densified edges on the substrate plate after the catalyst layer has been deposited on the substrate plate. When the catalyst is deposited first, the catalyst layer will form evenly on the substrate plate because the entire plate has substantially the same density or porosity. After the catalyst has been deposited on the substrate plate, the plate is positioned in a die and the densifying ink is injected into the plate margins from the side of the plate opposite the catalyst layer. A backup plate supports the catalyst layer and defines a forming surface for the edge seal band which is coplanar with the top of the catalyst layer. Thus no separate filler band need be formed. Also, the seal band will be forced up into the plate pores until it abuts the underside of the edges of the catalyst layer. The integrated filler band will be the same thickness as the catalyst layer and will be in intimate sealing contact with the edges of the catalyst layer.

It is therefore an object of this invention to provide an improved electrode plate assembly for use in a fuel cell which uses an aqueous electrolyte.

It is a further object of this invention to provide an electrode plate assembly of the character described which has an improved catalyst layer and an improved edge seal.

It is an additional object of this invention to provide an electrode plate assembly of the character described wherein the edge seal is formed from a densifying ink material which is injected into the margins of a porous substrate plate component of the assembly.

It is another object of this invention to provide an electrode plate assembly of the character described wherein the edge seal is disposed in intimate contact with inner and side surfaces of the margin of the catalyst layer.

It is yet another object of this invention to provide an electrode plate assembly of the character described wherein the edge seal is injected into the margins of the substrate plate under pressure after the catalyst layer has been deposited on the substrate plate, and the edge seal has an integral portion thereof which lies outwardly of the side edges of the catalyst layer and has a top surface which is coplaner with the top surface of the catalyst layer.

These and other objects and advantages of the invention will become more readily apparent from the following detailed description of a preferred embodiment thereof when taken in conjunction with the accompanying drawings, in which:

BRIEF DESCRIPTION OF DRAWINGS

FIG. 3 is a fragmented perspective view, partially in section, of a screen printing press useful for injecting the edge seal ink into the electrode assembly of this invention; and FIG. 4 is a fragmented sectional view of an alternative injection die which can be used to impregnate the edges of tbe substrate plates with the sealant material.

BEST MODE FOR CARRYING OUT THE INVENTION

Figure 1:
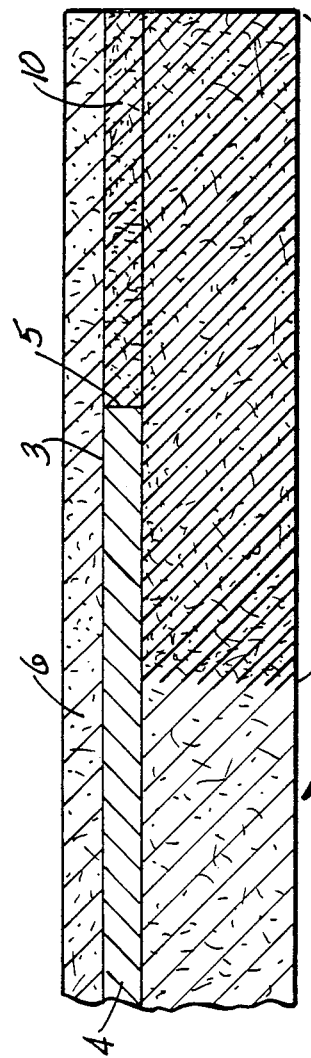
FIG. 1 is a fragmented sectional view of the edge portion of an electrode assembly formed in accordance with the prior art.

Referring now to FIG. 1, the edge seal construction of the prior art is shown. The electrode assembly includes a substrate plate denoted generally by the numeral 2 and a catalyst layer 4 deposited on one surface of the substrate plate 2. The matrix layer 6 is also shown adjacent to the catalyst layer 4. The matrix layer 6 is a porous layer which holds the aqueous electrolyte, such as phosphoric acid, and is interposed between the anode electrode and the cathode electrode in the fuel cell. As previously noted, the substrate 2 is formed from particulate carbon in the form of powder or fibers, or a mixture thereof, combined with a carbonizable binder, such as a thermosetting phenolic resin. The assembly shown in FIG. 1 is formed by first injecting a densifying ink into the edge portions 8 of the substrate plate 2. The catalyst layer 4 is then deposited on the substrate plate 2. It is noted that the catalyst layer 4 overlies the densified edge 8 of the substrate plate 2 to a substantial degree. This provides added protection against corrosion of the substrate, which corrosion will tend to be concentrated at the edges of the catalyst layer due to high electrical potential which occurs there if gases are able to penetrate this portion of the substrate. The overlap also causes a problem when the densification of the substrate edge precedes deposition of the catalyst layer on the substrate, since the catalyst layer will be deposited while applying a vacuum to the back of the substrate. The vacuum will not be evenly transmitted through the substrate by the densified and non-densified areas of the substrate, as a result, the catalyst layer will be thinner than desired where it overlaps the densified edges of the substrate. After the catalyst 4 has been deposited, the outboard part of the densified area 8 is built up to a level even with the top surface 5 of the catalyst layer 4 by applying additional densifying ink in a layer 10 called a filler band. This filler band layer 10 can be applied by screen printing, by a doctor blade, or otherwise to the top surface of the densified area 8 of the substrate 2. The filler band 10 is intended to seal the side edges 5 of the catalyst layer 4 against gas leakage. The fact that the filler band 10 must be applied separately from the impregnation step in the prior art is undesirable for a number of reasons. Drawbacks to this requirement include the fact that there is no intimate relationship between the edges 5 of the catalyst layer 4 and the filler band 10, and there is also a distinct interface between the filler band 10 and the underlying densified edge 8 of the substrate 2. These conditions can result in gas leaks at the edges of the catalyst layer 4. Another disadvantage relates to the fact that the production of the finished electrode assemblies includes an extra step which is time consuming and adds expense.

Figure 2:
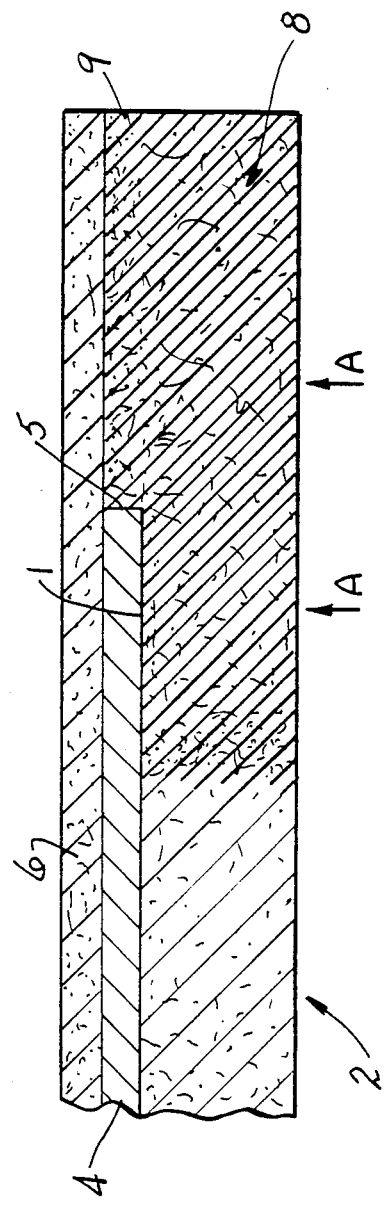
FIG. 2 is a view similar to FIG. 1 but showing the edge of the electrode assembly formed in accordance with this invention.

Referring now to FIG. 2, the sealed edge portion of an electrode assembly made in accordance with the invention is shown. The assembly includes the same three components shown in FIG. 1, i.e., the substrate plate 2, the catalyst layer 4, and a matrix layer 6. In forming the substrate assembly shown in FIG. 2, the substrate plate 2 is first produced. The catalyst layer 4 is then deposited on one surface of the substrate plate 2. The sealed edge portion 8 is then formed by injecting the filler ink into the edges of the substrate 2 under pressure through the side of the substrate 2 away from the catalyst layer 4, in the direction of the arrows A. In the embodiment shown in FIG. 2, the filler band 9 is an integral part of the sealing edge 8 and is produced by forcing the ink through the substrate 2, and out the top surface 1 of the substrate 2. Thus there will not be a well defined interface between the sealing edge 8 and the filler band 9. In addition, the injecting pressure will force the filler ink into intimate contact with the underside of the catalyst layer 4 in the overlap zone, and also into intimate contact with the side surface 5 of the catalyst layer 4. The result is an improved seal at the catalyst-seal zone interfaces, and an improved filler band. The formation of the seal zone can also be accomplished in one step, thus lowering the cost of the part.

Referring now to FIG. 3, there is shown a conventional screen printing press which is adapted to form electrode assemblies in accordance with this invention. The press, denoted generally by the numeral 20 includes a vacuum bed 22 with a honeycomb interior 24 to which a vacuum is selectively applied through line 26. A 7-10" Hg vacuum will satisfactorily operate the press to perform the method of this invention. The top of the vacuum bed 22 is formed by a perforated plate 8. A frame 30 is mounted above the bed 22 for pivotal movement about an axis 32. The frame carries a screen 34 which has its central part 36 and outermost part 38 closed off, or rendered imperforate. A medial part 40 of the screen 34, which corresponds to the margins of the plates to be sealed, is left open. To form the seal with the press of FIG. 3, a sheet of porous absorbent paper 42 is first laid on the perforated plate 28. The paper 42 will absorb ink and prevent it from contacting the plate 28, while at the same time allowing the drawing of the vacuum. The substrate plate 2 having the catalyst layer 4 predeposited thereon is placed on the paper sheet 42 with the catalyst layer 4 against the paper sheet 42. The screen 34 is flooded with the densifying ink by means of a conventional flood bar (not shown). With the frame 20 in position as shown in FIG. 3, the vacuum is applied in the bed 22. When the vacuum is applied to the bed, the edges of the screen 34 which are closed and designated by the numeral 38 will be pulled down onto the paper layer 42 to seal off the sides of the substrate 2. The densifying ink is drawn through the open area 40 of the screen and into the substrate 2 by the vacuum. The paper layer 42 protects the perforated plate 28 from being inked by the ink that is drawn through the edges of the substrate 2. When the impregnation is finished, the screen is squeegeed in a conventional manner to remove excess ink. The paper sheet 42 is replaced after the inked substrate is removed for further processing. The process is then repeated on a new substrate. The screen printing is a preferred mode for impregnating relatively thin substrates, on the order of about 0.025 inch thick.

When thicker substrates, in the range of about 0.065 inch to about 0.100 inch thick are impregnated, the apparatus of FIG. 4 is preferred due to the fact that it can achieve a higher pressure differential across the substrate than a screen printing press can. The apparatus of FIG. 4 includes a base 50 which has an upper surface 52 out of which an ink cavity 54 opens. The ink cavity 54 extends around the perimeter of the base 50. A line 56 opens into the cavity 54 from a pump 58 which forms the ink reservoir for the apparatus. Pressures in the range of 10 psi to 100 psi can be applied to the ink in the pump 58 by moving a piston (not shown) or the like in the direction of the Arrow B. Ink under pressure will then be forced into the cavity 54. The apparatus also includes a backup plate 60 which can be biased toward the base 50 during the impregnation step. The backup plate 60 may be provided with a perforated portion 62 connected to a source of vacuum which allows the plate 60 to serve as a transfer mechanism for moving the substrate assemblies onto and off of the base 50. The perforated portion 62 is approximately the same size as, and coterminous with the catalyst layer 4 on the substrate plate 2. To perform the transfer operation, the backup plate 60 is lowered into a substrate assembly oriented as shown in FIG. 4. A vacuum is then drawn through the perforated portion 62 causing the substrate assembly to adhere to the plate 60. The plate 60 is then lifted and moved to a position over the base 50 whereupon it is lowered until the substrate assembly contacts the top surface 52 of the base 50. When the substrate assembly is in place on the base 50, a positive pressure of about 30 psi will be applied to the backup plate 60 to press the substrate assembly against the base 50. It will be noted that the edge of the substrate plate 2 extends outwardly beyond the outer edge of the ink cavity 54 a distance of which is approximately equal to the thickness of the substrate plate 2. When the substrate assembly is in place and under pressure from the backup plate 60, the pump 58 is activated and the ink is injected into the edges of the substrate plate 2 from the cavity 54. The ink will fill the area bounded by the phantom line 64, which, as will be noted, extends along the bottom surface 61 of the backup plate 60, coplanar with the top surface of the catalyst layer 4. The filler band will thus be formed at the same time as the rest of the edge seal.

The densifying ink is preferably an aqueous dispersion of less than 1 micron size particles of carbon black, graphite, silicon carbide, or other inorganic solids compatible with phosphoric acid at temperatures of 400° F., or mixtures of such solids. The solids content can be in the range of about 50% to about 75% by weight. A fluorocarbon binder is included in concentrations of from about 1% to about 15% by weight. An anionic dispersant may be necessary in concentrations of about 1% to about 5% by weight to minimize particle settling over long storage periods. The plate is then dried to remove the liquid component of the ink from the plate, leaving behind a dry edge seal.

It will be readily appreciated that the edge seal formed by the instant invention will be operationally superior to that formed by the prior art, and that the catalyst layer will be more evenly deposited by following the teachings of the present invention, as compared to the prior art. The electrode assemblies of the invention will also be simpler and more quickly produced. By eliminating a manufacturing step from the procedure of the prior art, the assemblies of this invention will also be less expensive to manufacture.

Since many changes and variations of the disclosed embodiments of the inventions may be made without departing from the inventive concept, it is not intended to limit the invention otherwise than as required by the appended claims.

What is claimed is:

1. A method of forming an electrode plate assembly for use in a fuel cell power plant, said method comprising steps of:
   (a) providing a porous carbonaceous electrode substrate plate having two major planar surfaces and side edges interconnecting said two major planar surfaces;
   (b) depositing a catalyst layer on one of said major planar surfaces, said catalyst layer having side edges thereof offset inwardly from the side edges thereof offset inwardly from the side edges of said substrate plate, and said catalyst layer having an exposed surface offset from said one of said major planar surfaces and extending between said catalyst layer side edges;
   (c) injecting a liquid gas sealant material into said substrate plate through the other of said two major planar surfaces at margins thereof adjacent each of said substrate plate side edges and beneath said catalyst layer to form a unitary edge gas sealing band on said assembly which intimately contacts the underside of marginal portions of said catalyst layer, and which includes an exposed surface coplanar with said exposed surface of said catalyst layer, said gas sealing band extending to said side edges of said substrate plate.

2. The method of claim 1 including the step of confining said substrate plate, after depositing said catalyst layer thereon, in a press which has a planar surface which abuts the exposed surface of said catalyst layer, and wherein said injection step is performed in said press with the liquid sealant material being coplanar wih said catalyst layer exposed surface, by flowing into contact with said press planar surface.

* * * * *